UNITED STATES PATENT OFFICE.

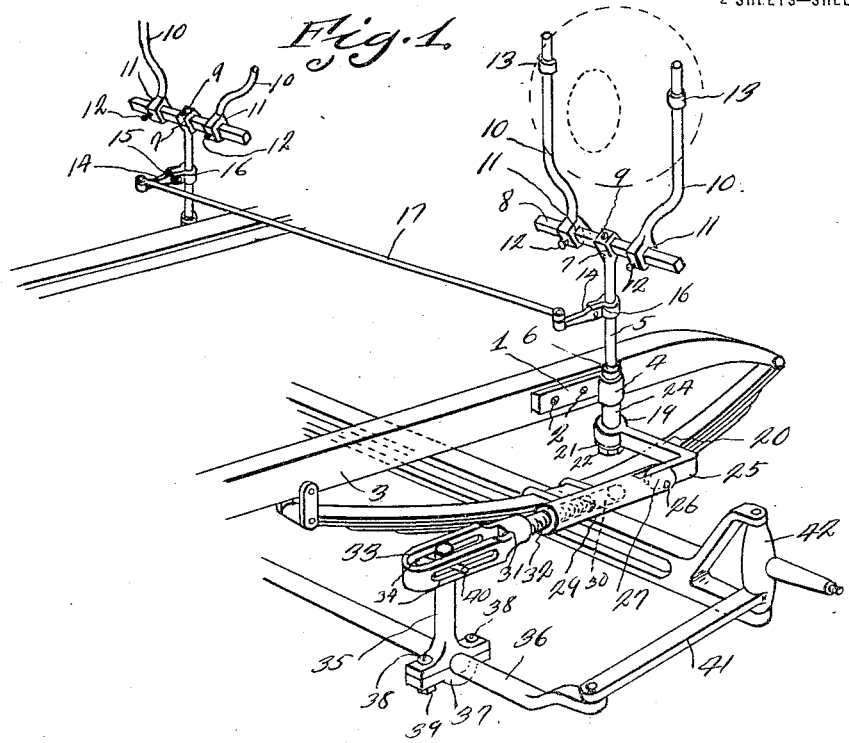
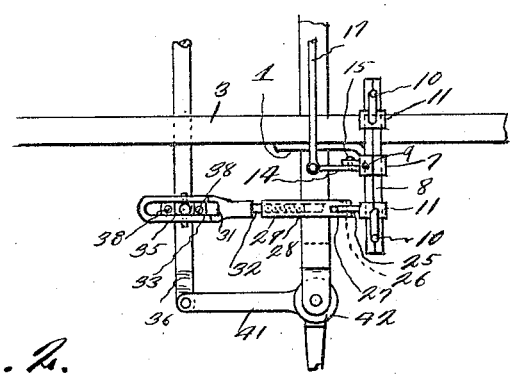

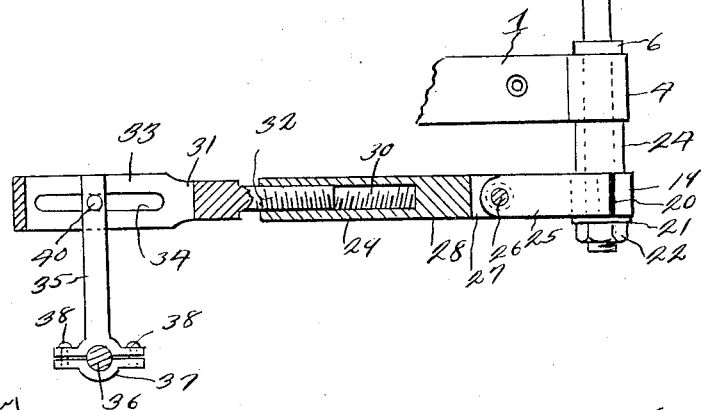

JESSE F. SPENCER, OF TOPPENISH, WASHINGTON.

DIRIGIBLE HEADLIGHT.

1,312,812.	Specification of Letters Patent.	Patented Aug. 12, 1919.

Application filed May 18, 1918. Serial No. 235,272.

*To all whom it may concern:*

Be it known that I, JESSE F. SPENCER, a citizen of the United States, residing at Toppenish, in the county of Yakima, State of Washington, have invented a new and useful Dirigible Headlight; and I do hereby declare the following to be a full, clear, and exact description of the invention, such as will enable others skilled in the art to which it appertains to make and use the same.

This invention relates to an improved dirigible headlight mechanism for automobiles.

One of the objects of the invention is to provide an automobile dirigible headlight mechanism, whereby the headlights may turn in a direction correspondingly with the front wheels.

A further object of the invention is to provide improved, simple, efficient and practical means for controlling the headlights correspondingly with the front wheels by the manipulation of the steering mechanism.

In practical fields the details of construction may necessitate alterations falling within the scope of what is claimed.

The invention comprises further features and combination of parts as hereinafter set forth shown in the drawings and claimed.

In the drawings:—

Figure 1 is a view in perspective of the headlight mechanism as applied to the frame or chassis of an automobile.

Fig. 2 is a plan view of one side of the headlight mechanism showing the lamp removed.

Fig. 3 is a view in side elevation of a part of the headlight mechanism, showing a portion of the connections with the cross connecting rod of a steering mechanism in section.

Fig. 4 is a vertical sectional view through the bearing of the lamp bracket spindle, and through the connections to the lower end of said spindle or shank.

Fig. 5 is a detail view showing the spindle of the lamp bracket as having been adjusted and only supporting one fork for the lamp.

Referring more especially to the drawings 1 designates a bracket, which is secured at 2 to one of the sides of the frame or chassis, said frame being designated by the numeral 3. This bracket has a bearing 4, for the reception of the spindle or shaft 5. This spindle or shaft has an integral collar 6 engaging the top of the bearing 4 preventing downward movement of the spindle. The upper end of the spindle terminates in a rectangular eye 7, to receive the bar or rod 8, which is correspondingly rectangular in cross section, to engage through the eye, there being a set screw 9 for holding the bar or rod 8 in different adjusted positions. As shown in Fig. 1 a pair of forks 10 is provided. The lower ends of the forks have rectangular eyes 11, for the reception of the bar or rod 8, there being set screws 12, for holding the forks 10 in different adjusted positions, according to the diameter of the lamp casing. The forks 10 are designed to pass through the eyes 13, which may be carried by the lamp casing. To accommodate lamp casings of different diameters, the forks may be separated or brought together, as the case may be. In the use of the dirigible mechanism there will be a pair of spindles 5, one on each side of the frame or chassis, each carrying bar supported forks, said spindles being mounted in said brackets. Arms 14 and 15 are carried by said spindles, the split sleeves 16 of said arms being clamped on the spindles as shown, that is so that said arms may be adjusted. A rod 17 pivotally connects the arms, so that when one spindle is rocked, the other correspondingly moves. The lower end of one of the spindles 5 terminates in a rectangular portion 18, to which the rectangular eye end 19 of the arm 20 is fitted, there being a washer 21 and a nut 22 applied to the threaded extension 23 of the spindle to hold the arm on the rectangular part 18. A sleeve 24 is mounted upon the spindle, between the bearing 4 and the eye end of the arm 20, to prevent upward movement of the spindle. The arm 20 has a lateral part or extension 25, which is pivotally mounted as at 26 between the forks 27 of the coupling member 28, which is provided with a tubular part 29 interiorly threaded as at 30. A second coupling member 31 has a threaded extension 32 engaging the threads 30 of the tubular part 29 of the coupling member 28. The coupling member 31 has a loop portion 33, the side walls of which are provided with slots 34. An upstanding arm 35 is clamped on the connecting rod 36 by the clamping plate 37, the screws and nuts 38 and 39. This upstanding arm engages between the side walls of the loop 33, there being a pin 40 extending transversely of the upper end of the arm 35 and engaging the slots 34, so that when the connecting rod 36 shifts toward one side or the other, the spindle 5 will be rocked in its bearings through the connections between the spindle and the arm 35. The coupling members of said connections between the spindle and the arm 35 are swiveled by the threaded connections 30 and 32. The connecting rod 36 connects the usual arms 41 of the knuckle hub 42, which are designed to carry the front wheels of the automobile. It is to be noted that the arms 20 may be disconnected from the spindle 5, and the spindle given a quarter turn, and the arm 20 reconnected to the rectangular part 18, whereby the bar or rod 8 may extend rearwardly. In this case the arm 14 must be adjusted accordingly so as to extend rearwardly and then only one fork 10 is employed to support the lamp casing as in Fig. 5.

The invention having been set forth what is claimed as new and useful is:—

A dirigible headlight mechanism including a lamp supporting bracket, said lamp supporting bracket having a vertically disposed shaft, said shaft being rockably mounted in a bearing secured to the side of an automobile frame, an L-shaped member having one of its arms secured to the lower end of the vertical shaft, said arm extending laterally from the side of the vehicle, the other arm of said L-shaped member extending rearwardly, a pivoted sleeve having one of its ends pivoted to said rearwardly extending arm, the free end of said sleeve being provided with a threaded aperture, said aperture having threaded therein a yoke member, said yoke member being provided with elongated slots, one of said slots being in a vertical plane, the other slots being in a horizontal plane, a vertically disposed shaft secured to the connecting rod of the steering mechanism, the upper end of said rod being provided with a transversely disposed pin, the end of said vertically disposed rod being disposed in the elongated slot between the elongated slots that are in a horizontal plane and the ends of the transversely disposed pin carried by the upper end of the vertical shaft carried by the connecting rod disposed in the elongated slots at either side of the first mentioned slot.

In testimony whereof I have signed my name to this specification in the presence of two subscribing witnesses.

JESSE F. SPENCER.

Witnesses:
CHARLES SCHERER,
HARRY HARVARD.